United States Patent
Cohen et al.

(10) Patent No.: US 9,579,745 B2
(45) Date of Patent: Feb. 28, 2017

(54) SYSTEMS AND METHODS FOR ENHANCING PERFORMANCE OF A MICROPHONE

(75) Inventors: Sawyer Cohen, Cupertino, CA (US); Scott Porter, Cupertino, CA (US); Ruchir Dave, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/598,332

(22) Filed: Aug. 29, 2012

(65) Prior Publication Data

US 2014/0064545 A1 Mar. 6, 2014

(51) Int. Cl.
| | | |
|---|---|---|
| *H04R 1/20* | (2006.01) | |
| *B23K 13/01* | (2006.01) | |
| *B23K 1/00* | (2006.01) | |
| *B23K 1/008* | (2006.01) | |
| *H04R 1/22* | (2006.01) | |
| *H04R 1/28* | (2006.01) | |

(52) U.S. Cl.
CPC .............. *B23K 13/01* (2013.01); *B23K 1/008* (2013.01); *B23K 1/0016* (2013.01); *H04R 1/222* (2013.01); *H04R 1/28* (2013.01); *B23K 2201/42* (2013.01); *H04R 1/288* (2013.01); *Y10T 29/4957* (2015.01)

(58) Field of Classification Search
USPC .......................... 381/346, 355, 369, 365, 362
See application file for complete search history.

(56) References Cited

U.S. PATENT DOCUMENTS

| | | | | |
|---|---|---|---|---|
| 3,600,501 A | * | 8/1971 | Crimmins | H01R 4/10 |
| | | | | 174/94 R |
| 4,009,355 A | * | 2/1977 | Poradowski | H04R 1/38 |
| | | | | 381/191 |
| 4,410,770 A | * | 10/1983 | Hagey | 381/177 |
| 4,757,546 A | * | 7/1988 | Akino | 381/357 |
| 6,073,723 A | * | 6/2000 | Gallo | H04R 1/288 |
| | | | | 181/146 |
| 8,009,851 B2 | * | 8/2011 | De Pooter | H04R 1/086 |
| | | | | 381/355 |
| 8,515,113 B2 | * | 8/2013 | Rothkopf | H04R 31/00 |
| | | | | 381/355 |
| 2003/0039572 A1 | * | 2/2003 | Kosco | B22F 3/105 |
| | | | | 419/28 |
| 2009/0169039 A1 | * | 7/2009 | Rasmussen | H04R 25/652 |
| | | | | 381/322 |
| 2010/0142743 A1 | * | 6/2010 | Tanaka | H04R 1/04 |
| | | | | 381/346 |

\* cited by examiner

*Primary Examiner* — Amir Etesam
(74) *Attorney, Agent, or Firm* — Kilpatrick Townsend & Stockton LLP

(57) ABSTRACT

Systems and methods for enhancing performance of a microphone are disclosed. An airflow control system may include a block-shaped structure and an airflow impedance element residing within a cavity of the block-shaped structure. The airflow impedance element may be formed by filling the cavity with a plurality of pre-processed airflow impedance elements and sintering these elements, and may include a plurality of non-linear pathways. The plurality non-linear pathways may both impede airflow therethrough (e.g., when a force exerted by the airflow exceeds a predetermined amount) and pass sound that may match a frequency response of a microphone without substantially affecting the amplitude and frequency characteristics of the sound.

21 Claims, 9 Drawing Sheets

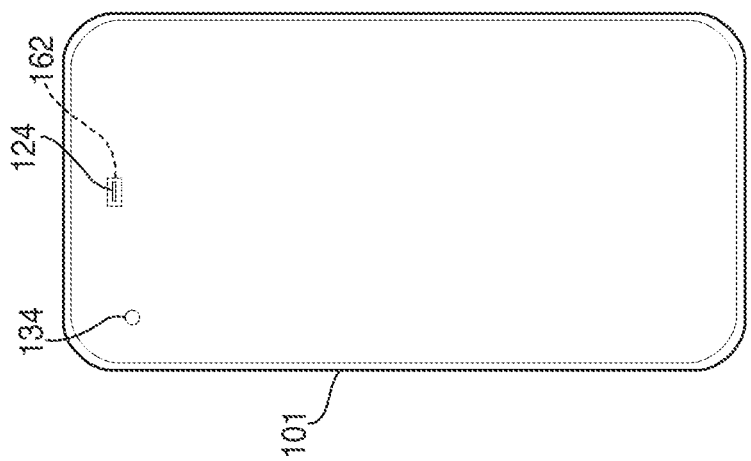
FIG. 1C
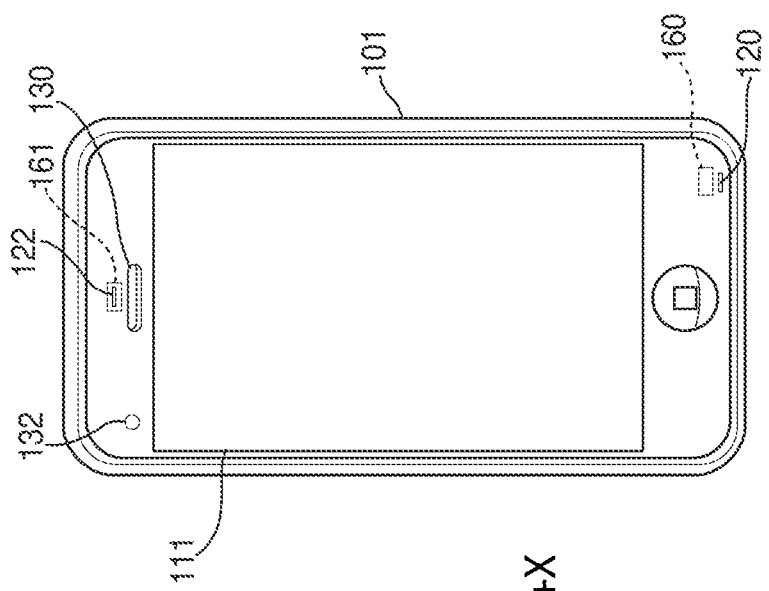
FIG. 1B
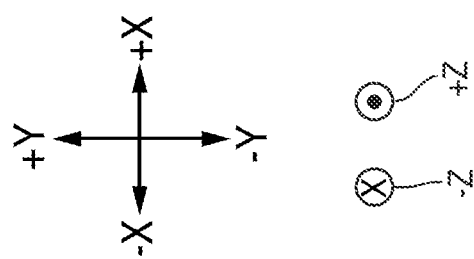

SYSTEMS AND METHODS FOR ENHANCING PERFORMANCE OF A MICROPHONE

FIELD OF THE INVENTION

This can relate to systems and methods for enhancing performance of a microphone.

BACKGROUND OF THE DISCLOSURE

Many electronic devices include microelectromechanical system (MEMS) components. Sometimes referred to as a micromachine, a MEMS component, such as a MEMS microphone, is smaller than a conventional counterpart, and may thus allow an electronic device to be made smaller. A MEMS microphone may be situated within a housing of an electronic device, such as adjacent to a surface of the housing. One problem with existing MEMS microphones is that, if a MEMS microphone is subjected to forceful airflow (e.g., from a deliberate forceful blasting of compressed air thereon, or from severe environmental conditions, such as extreme winds), air particles of the forceful airflow may be directed up one or more apertures and towards the MEMS microphone. When this occurs, the performance of the microphone may become affected.

SUMMARY OF THE DISCLOSURE

Systems and methods for enhancing performance of a microphone are provided.

In some embodiments, an airflow control system for controlling airflow toward a microphone of an electronic device may be provided. The airflow control system may include a block-shaped structure that may include a passageway. The passageway may include a first opening configured to align with an aperture of the electronic device, and a second opening configured to align with an aperture of the microphone. The airflow control system may also include an airflow impedance element disposed within the passageway and constructed to control the airflow from the first opening to the second opening.

In some embodiments, a method of manufacturing an airflow control system for a microphone may be provided. The method may include situating a block-shaped structure in a heating apparatus. The block-shaped structure may include a passageway having a first opening and a second opening. The method may also include filling the passageway with a plurality of pre-processed airflow impedance elements, and heating using the heating apparatus the block-shaped structure to sinter the filled plurality of pre-processed airflow impedance elements in the passageway.

In some embodiments, an electronic device may be provided. The electronic device may include a housing that may include a housing aperture. The electronic device may also include a circuit board having mounted thereon a microphone. The microphone may include a microphone aperture. The electronic device may also include an airflow control system secured between the housing and circuit board. The airflow control system may fluidically couple the housing aperture to the microphone aperture and comprises a sintered airflow impedance element.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 1B is a front view of the electronic device of FIG. 1A, in accordance with at least one embodiment of the invention;

FIG. 1C is a back view of the electronic device of FIG. 1A, in accordance with at least one embodiment of the invention;

DETAILED DESCRIPTION OF THE DISCLOSURE

Systems and methods for enhancing performance of a microphone are provided and described with reference to FIGS. 1-7.

Figure 1A:
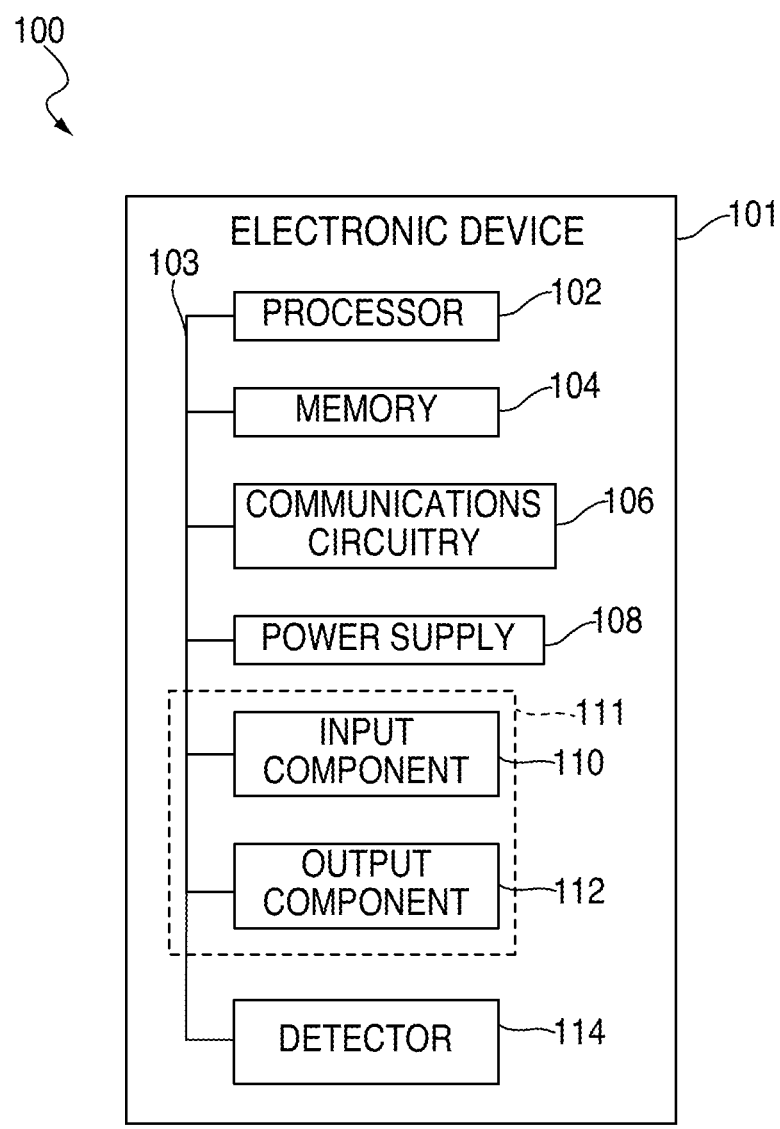
FIG. 1A is a schematic view of an illustrative electronic device, in accordance with at least one embodiment of the invention.

FIG. 1 is a schematic view of an illustrative electronic device 100 that may couple to and be used with a listening device by a user. In some embodiments, electronic device 100 may perform a single function (e.g., a device dedicated to storing image content) and, in other embodiments, electronic device 100 may perform multiple functions (e.g., a device that stores image content, plays music, and receives and transmits telephone calls). Moreover, in some embodiments, electronic device 100 may be any portable, mobile, or hand-held electronic device configured to control output of content. Alternatively, electronic device 100 may not be portable at all, but may instead be generally stationary. Electronic device 100 may include any suitable type of electronic device operative to control output of content. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a tablet, a laptop computer, a desktop computer, a music recorder, a still camera, a movie or video camera or recorder, a radio, medical equipment, any other suitable type of electronic device, and any combinations thereof.

Electronic device 100 may include a processor or control circuitry 102, memory 104, communications circuitry 106, power supply 108, input component 110, output component 112, and a detector 114. Electronic device 100 may also include a bus 103 that may provide a transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the other components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, a microphone, and combinations thereof. For example, input component 110 may include a multi-touch screen. Each input component 110 can be configured to provide one or more dedicated control functions for making selections or issuing commands associated with operating device 100.

Electronic device 100 may also include one or more output components 112 that may present information (e.g., textual, graphical, audible, and/or tactile information) to a user of device 100. Output component 112 of electronic device 100 may take various forms, including, but not limited to, audio speakers, in-ear earphones, headphones, audio line-outs, visual displays, antennas, infrared ports, rumblers, vibrators, or combinations thereof.

For example, output component 112 of electronic device 100 may include an image display 112 as an output component. Such an output component display 112 may include any suitable type of display or interface for viewing image data captured by detector 114. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display.

In some embodiments, output component 112 may include an audio output module that may be coupled to an audio connector (e.g., a male audio jack) for interfacing with an audio device (e.g., a headphone, an in-ear earphone, a microphone, etc.).

It should be noted that one or more input components 110 and one or more output components 112 may sometimes be referred to collectively herein as an I/O interface (e.g., input component 110 and output component 112 as I/O interface 111). It should also be noted that input component 110 and output component 112 may sometimes be a single I/O component, such as a touch screen that may receive input information through a user's touch of a display screen and that may also provide visual information to a user via that same display screen.

Detector 114 may include one or more sensors of any suitable type that may capture human recognition data (e.g., face data) that may be utilized to detect the presence of one or more individuals. For example, detector 114 may include an image sensor and/or an infrared sensor. The image sensor may include one or more cameras with any suitable lens or number of lenses that may be operative to capture images of the surrounding environment of electronic device 100. For example, the image sensor may include any number of optical or digital lenses for capturing light reflected by the device's environment as an image. The captured light may be stored as an individual distinct image or as consecutive video frame images of a recording (e.g., several video frames including a primary frame and one or more subsequent frames that may indicate the difference between the primary frame and the subsequent frame). As used herein, the term "camera lens" may be understood to mean a lens for capturing light or a lens and appropriate circuitry for capturing and converting captured light into an image that can be analyzed or stored by electronic device 100 as either an individual distinct image or as one of many consecutive video frame images.

In some embodiments, detector 114 may also include one or more sensors that may detect any human feature or characteristic (e.g., physiological, psychological, physical, movement, etc.). For example, detector 114 may include a microphone for detecting voice signals from one or more individuals. As another example, detector 114 may include a heartbeat sensor for detecting heartbeats of one or more individuals. As yet other examples, detector 114 may include a fingerprint reader, an iris scanner, a retina scanner, a breath sampler, and a humidity sensor that may detect moisture and/or sweat emanating from any suitable portion of an individual's body. For example, detector 114 may include a humidity sensor that may be situated near or coupled to one or more portions of input component 110, and that may detect moisture and/or sweat from an individual's hands. It should be appreciated that any detector 114 may include any sensor that may detect any human feature or characteristic.

In some embodiments, detector 114 may also include positioning circuitry for determining a current position of device 100. The positioning circuitry may be operative to update the current position at any suitable rate, including at relatively high rates to provide an estimation of speed and distance traveled. In some embodiments, the positioning circuitry may include a global positioning system ("GPS") receiver for accessing a GPS application function call that may return geographic coordinates (i.e., a geographic location) of the device. The geographic coordinates may be fundamentally, alternatively, or additionally, derived from any suitable trilateration or triangulation technique. For example, the positioning circuitry may determine the current location of device 100 by using various measurements (e.g., signal-to-noise ratio ("SNR") or signal strength) of a network signal (e.g., a cellular telephone network signal) that may be associated with device 100. For example, a radio frequency ("RF") triangulation detector or sensor integrated with or connected to device 100 may determine the (e.g., approximate) current location of device 100. Device 100's current location may be determined based on various measurements of device 100's own network signal, such as, for example: (1) an angle of the signal's approach to or from one or more cellular towers, (2) an amount of time for the signal to reach one or more cellular towers or device 100, (3) the strength of the signal when it reaches one or more towers or device 100, or any combination of the aforementioned measurements. Other forms of wireless-assisted GPS (e.g., enhanced GPS or A-GPS) may also be used to determine the current position of device 100. Instead or in addition, the positioning circuitry may determine the current location of device 100 based on a wireless network or access point that may be in range or a wireless network or access point to which device 100 may be currently connected. For example, because wireless networks may have a finite range, a wireless network that may be in range of device 100 may indicate that device 100 is located in within a detectable vicinity of the wireless network. In some embodiments, device 100 may automatically connect to a wireless network that may be in range in order to receive valid modes of operation that may be associated or that may be available at the current position of device 100.

In some embodiments, detector 114 may also include motion sensing circuitry for detecting motion of an environment of device 100 and/or objects in the environment. For example, the motion sensing circuitry may detect a movement of an object (e.g., an individual) about device 100 and may generate one or more signals based on the detection.

Processor 102 of device 100 may control the operation of many functions and other circuitry provided by device 100. For example, processor 102 may receive input signals from input component 110 and/or drive output signals through display 112. Processor 102 may load a manager program (e.g., a program stored in memory 104 or another device or server accessible by device 100) to process or analyze data received via detector 114 or inputs received via input component 110 to control output of content that may be provided to the user via output component 112 (e.g., display 112). Processor 102 may associate different metadata with the human recognition data captured by detector 114, including, for example, positioning information, device movement information, a time code, a device identifier, or any other suitable metadata. Electronic device 100 (e.g., processor 102, any circuitry of detector 114, or any other component available to device 100) may be configured to capture data with detector 114 at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Electronic device 100 may include one or more microphones (e.g., as part of I/O interface 111) for capturing sounds from the environment (e.g., a user's voice). It should be appreciated that various criteria may be used to select the type of microphone for inclusion in an electronic device. For example, it is preferable to use microphones that draw minimal power, that are compact, and that are easy to manufacture and integrate in into electronic devices. As another example, it is important to choose a microphone that provides a good frequency response. For example, a microphone may have a good frequency response if it can receive sounds over a range of frequencies that are audible to humans. MEMS microphones provide one or more of these features. For example, MEMS microphones are smaller than conventional counterparts, and may allow an electronic device to be made smaller. They are also easy to integrate into electronic devices and can provide good frequency responses.

FIG. 1B is a front view of electronic device 100. As shown in FIG. 1B, housing 101 may at least partially enclose I/O interface 111. Moreover, housing 101 may include a microphone 160 (e.g., a MEMs microphone) and an aperture 120 through a portion of housing 101 (e.g., cut through a glass portion of housing 101). Aperture 120 may be situated on a bottom surface of electronic device 100 and may face the −Y direction. Microphone 160 may be situated within housing 101 and adjacent aperture 120 such that, when a user holds electronic device 100 close to the user's face, sound from the user's mouth may pass through aperture 120 and travel towards microphone 160.

Although typical electronic devices may only include a single microphone, electronic device 100 may include a plurality of microphones. For example, electronic device 100 may include an aperture 122 through another portion of housing 101 (e.g., cut through a glass portion of housing 101) and may, in addition to microphone 160, include a microphone 161 (e.g., another MEMS microphone). Aperture 122 may be situated on a front surface of housing 101 (e.g., adjacent a receiver 130 that may be a component of detector 114) and may face the +Z direction. Microphone 161 may be situated within housing 101 and adjacent aperture 122 such that, when a user holds electronic device 100 up with the front surface facing the user (e.g., during a video conference using a camera 132 of electronic device 100), sound from the user's mouth may pass through aperture 122 and travel towards microphone 161. Situating microphone 161 on the front surface of housing 101 may more efficiently capture sound during such a video conference call, since the sound from the user's mouth may not be sufficiently directed towards the bottom surface of housing 101 for microphone 160 to capture.

FIG. 1C is a back view of electronic device 100. As shown in FIG. 1C, electronic device 100 may include an aperture 124 through another portion of housing 101 (e.g., cut through a glass portion of housing 101) and may, in addition to microphones 160 and 161, include a microphone 162 (e.g., yet another MEMS microphone). Aperture 124 may be situated on a back surface of housing 101 (e.g., near a top portion of the back surface) and may face the −Z direction. Microphone 162 may be situated within housing 101 and adjacent aperture 124 such that, when a user holds electronic device 100 up with the back surface facing the user (e.g., during a video conference using a camera 134 of electronic device 100), sound from the user's mouth may pass through aperture 124 and travel towards microphone 162. Situating microphone 162 on the back surface of housing 101 may more efficiently capture sound during such a video conference call, since the sound from the user's mouth may not be sufficiently directed towards the front or bottom surfaces of housing 101 for any of microphones 160 and 161 to capture.

One problem with existing MEMS microphones is that, if a MEMS microphone is subjected to forceful airflow (e.g., from a deliberate forceful blasting of compressed air thereon, or from severe environmental conditions, such as extreme winds), air particles of the forceful airflow may be directed up one or more apertures of an electronic device as a pressure wave towards the microphone. For example, when forceful airflow is directed into an aperture (e.g., any one of apertures 120, 122, and 124) of electronic device 100, air particles of the forceful airflow may be directed at a corresponding microphone (e.g., a corresponding one of microphones 160, 161, and 162). If the force of the airflow exceeds a predetermined amount, the performance of the microphone may decrease.

Figure 2:
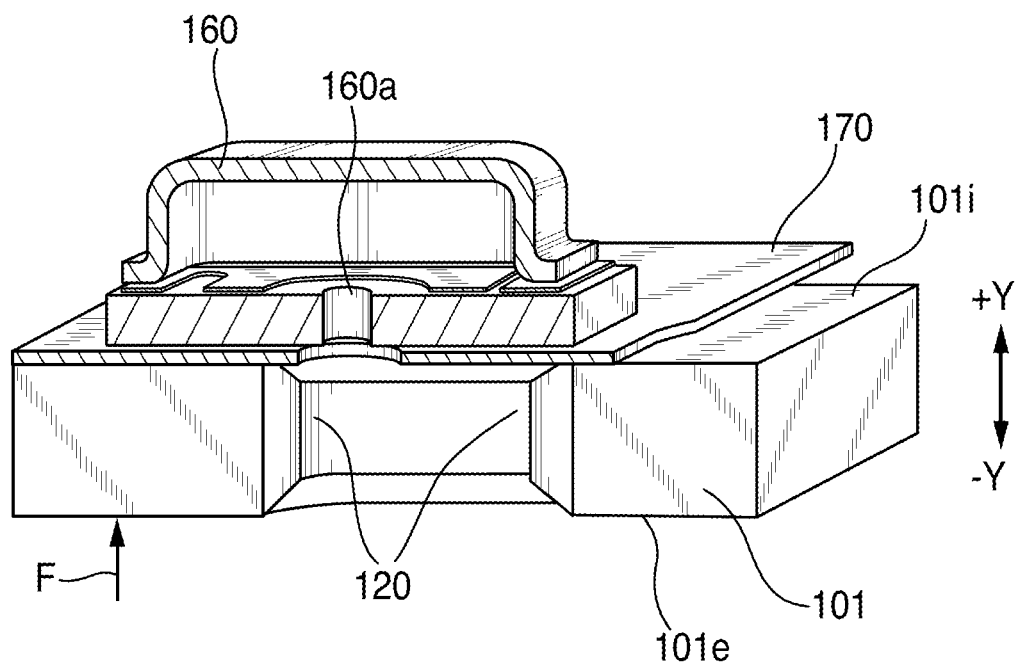
FIG. 2 is a cross-sectional view of a portion of the electronic device of FIG. 1A, in accordance with at least one embodiment of the invention.

FIG. 2 is a cross-sectional view of a portion of electronic device 100. The portion may include a portion of housing 101 having aperture 120, which may face the −Y direction. Housing 101 may include external surface side 101e and internal surface side 101i, and aperture 120 may extend from external surface side 101e to internal surface side 101i. A circuit board 170 (e.g., a flexible circuit board) may be situated adjacent internal surface side 101i and may include a microphone 160 that may be attached thereto. As described above, microphone 160 may be a MEMS microphone. Microphone 160 may include microphone aperture 160a for receiving sound (e.g., from a user's voice). Housing 101, circuit board 170, and microphone 160 may be aligned with respect to each other in any suitable manner. FIG. 2 shows these components aligned such that sound, that may enter housing 101 through aperture 120 in the +Y direction, may travel through housing aperture 120 and microphone aperture 160a into microphone 160, in this order.

Microphone 160 may include a diaphragm (not shown) that may receive the sound, and may process the received sound and/or send the received sound to processor 102 for processing. The performance of one or more components of microphone 160 (e.g., the diaphragm) may be affected, for example, when airflow is forcefully directed at microphone 160, at or above a predefined force F. The forceful airflow may cause air particles to travel through aperture 120 in the +Y direction and towards microphone 160. It should be appreciated that, although FIG. 2 only shows microphone 160, the performance of any one of microphones 161 and 162 may also be affected by forceful airflow.

Figure 3:
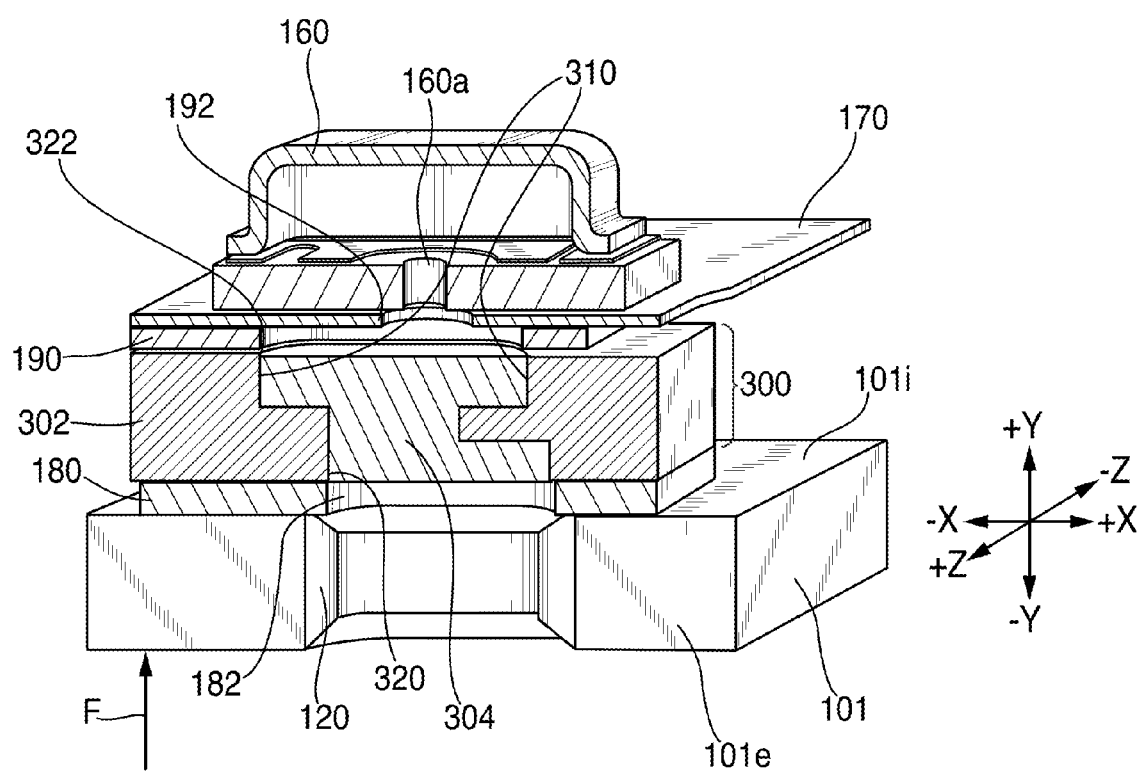
FIG. 3 is a cross-sectional view of the portion of the electronic device of FIG. 2, including an airflow control system, in accordance with at least one embodiment of the invention.

FIG. 3 is a cross-sectional view of the portion of electronic device 100 of FIG. 2, including a cross-section view of an airflow control system 300. Airflow control system 300 may, for example, be included in electronic device 100 to enhance the performance of microphone 160. For example, airflow control system 300 may prevent deliberate and/or forceful airflow from interfering with the operation of microphone 160. As another example, airflow control system 300 may reduce undesired noise (e.g., from windy conditions in an outdoor environment) from being detected by microphone 160. Airflow control system 300 may include block-shaped structure 302 having a cavity 310 that may extend from an opening 320 to an opening 322 of block-shaped structure 302. Airflow control system 300 may also include an airflow impedance element 304 that may reside within cavity 310 (e.g., throughout an entirety of cavity 310). Airflow control system 300 may be sandwiched by adhesives 180 and 190 that may be included to attach airflow control system 300 to housing 101 and circuit board 170, respectively. Adhesives 180 and 190 may include cut-outs 182 and 192, respectively, and may be aligned with housing 101, airflow control system 300, circuit board 170, and microphone 160 in any suitable manner. FIG. 3 shows these components aligned such that sound (e.g., from a user's voice), that may enter housing 101 through aperture 120 in the +Y direction, may travel through housing aperture 120, cut-out 182, airflow impedance element 304, cut-out 192, and microphone aperture 160a into microphone 160, in this order. Although FIG. 3 may show these various components aligned in a particular manner, any one of these components may be shifted from one another in any of the −X, +X, −Y, +Y, +Z, and −Z directions, as long as sound may travel from outside of housing 101 into microphone 160 in the +Y direction.

Block-shaped structure 302 may include any suitable type of material. In some embodiments, block-shaped structure 302 may be composed of injection molded plastic (e.g., PPA, LCP, or other high temperature resin). Block-shaped structure 302 may be shaped and sized for integration between microphone 160 and housing 101 based design or spacing requirements. Cavity 310 may initially be empty and may be sized and shaped for subsequent filling of airflow impedance element 304 therein.

Airflow impedance element 304 may be a single structure that may be formed from a plurality of pre-processed airflow impedance elements. For example, the plurality of pre-processed airflow impedance elements may include substantially round or bead-like elements that may have any suitable size (e.g., approximately 50 um in diameter each). Airflow impedance element 304 may be composed of any suitable material (e.g., polyethylene, polypropylene, etc.) and may be formed when the plurality of pre-processed airflow impedance elements are subjected to specific processing (e.g., a heating or sintering process).

The plurality of pre-processed airflow impedance elements may be soft and/or flexible enough to change shape or other properties when subjected to the processing. For example, during a heating or sintering process, the plurality of pre-processed airflow impedance elements may at least partially fuse to form airflow impedance element 304 (e.g., as a single structure). Because each of the plurality of pre-processed airflow impedance elements may initially be substantially round, a plurality of pores or pathways may form throughout airflow impedance element 304 as a result of the fusion. For example, the pathways may run from one surface of airflow impedance element 304 (e.g., the surface closest to external surface side 101e of housing 101) to another surface of airflow impedance element 304 (e.g., the surface closest to circuit board 170) so as to allow sound to pass in direction +Y. In this manner, when airflow impedance element 304 is disposed between aperture 120 and microphone 160 (e.g., as shown in FIG. 3), airflow impedance element 304 may fluidically couple aperture 120 and microphone aperture 160a (e.g., to allow fluid, or air particles, to pass from aperture 120 to microphone aperture 160a).

It should be appreciated that each pathway may or may not run from one surface of airflow impedance element 304 to another surface in a straight manner, but may traverse around or between particular ones of the fused plurality of airflow impedance elements in a plurality of directions to form a lengthened pathway. A lengthened pathway may provide an impedance effect on airflow through airflow impedance element 304 (e.g., from aperture 120 to microphone 160). For example, air particles from airflow that may typically flow directly through aperture 120 to microphone 160 (as shown in FIG. 2) may be forced to traverse longer non-linear pathways when airflow impedance element 304 is disposed between aperture 120 and microphone 160 (as shown in FIG. 3). When the air particles traverse these lengthened and non-linear pathways, they may contact walls of these pathways (e.g., surfaces of the fused plurality of airflow impedance elements), which may act to slow the air particles down. Thus, when microphone 160 is subjected to forceful airflow, the corresponding force (or speed) of air particles, that may otherwise affect the performance of microphone 160, may be substantially attenuated by these non-linear lengthened pathways of airflow impedance element 304.

As described above, microphones are typically designed or tuned to a specific frequency response, where sound within a certain range of frequencies are captured with minimal loss of amplitude. Accordingly, although it may be important to impede forceful airflow from affecting the performance of microphone 160, it may also be important to allow microphone 160 to successfully capture sound (e.g., air particles traveling in the range of frequencies that microphone 160 is tuned to capture). Thus, the non-linear lengthened pathways may also allow the air particles to successfully flow through airflow impedance element 304 with minimal effect to their respective frequency characteristics. For example, the non-linear lengthened pathways of airflow impedance element 304 may allow sound in human audible frequencies to pass through with minimal effect on its frequency and amplitude. Thus, airflow impedance element 304 may be constructed to both impede forceful airflow therethrough and match the frequency response of microphone 160.

It should be appreciated that any of the materials, the number of, and/or the size of the plurality of pre-processed elements (prior to heating or sintering thereof to form airflow impedance element 304) may be controlled to provide an airflow impedance element 304 that may both impede forceful airflow therethrough and match the frequency response of microphone 160. For example, pre-processed airflow impedance elements of certain materials may form more suitable pathways than others (e.g., materials that do not sinter well may not produce sufficient pathways that both impede forceful airflow therethrough and match the frequency response of microphone 160).

It should also be appreciated that any of the parameters of the heating or sintering process, the size of block-shaped structure 302, and the size of cavity 310 may also be controlled to provide an airflow impedance element 304 that may both impede forceful airflow therethrough and match the frequency response of microphone 160. For example, environmental parameters used during processing (e.g., heating or sintering) of the plurality of pre-processed airflow impedance elements may be set to form suitable pathways in the resulting airflow impedance element 304 (e.g., if too high or too low of a temperature is used to sinter the plurality of pre-processed airflow impedance elements, the desired pathways may or may not be produced, may or may not be produced in sufficient quantity, and/or may or may not be characterized so as to both impede forceful airflow therethrough and match the frequency response of microphone 160). As another example, the size and shape of cavity 310 may need to be configured to contain a suitable amount of the plurality of pre-processed airflow impedance elements and to house the resulting airflow impedance element 304 (e.g., if cavity 310 is too small or too large, air particles (e.g., at force F) may not be sufficiently impeded to enhance the performance of microphone 160).

In some embodiments, block-shaped structure 302 may be mounted to circuit board 170 (e.g., via adhesive 190 that may be applied as solder) during manufacturing of circuit board 170. Circuit board 170 may then undergo reflow processing to thoroughly solder and fix block-shaped structure 302 to circuit board 170). In this manner, production of electronic device 100 may be made simpler since only a single assembly or part may need to be attached to housing 101 (e.g., via adhesive 180) during manufacturing of electronic device 100. In these embodiments, block-shaped structure 302 may be at least partially composed of metal (e.g., stainless steel) in order to withstand high temperatures used during the reflow processing. In addition, the material of the plurality of pre-processed elements may also need to be selected such that the resulting airflow impedance element 304 may also withstand the high temperatures during the reflow processing.

Figure 4A:
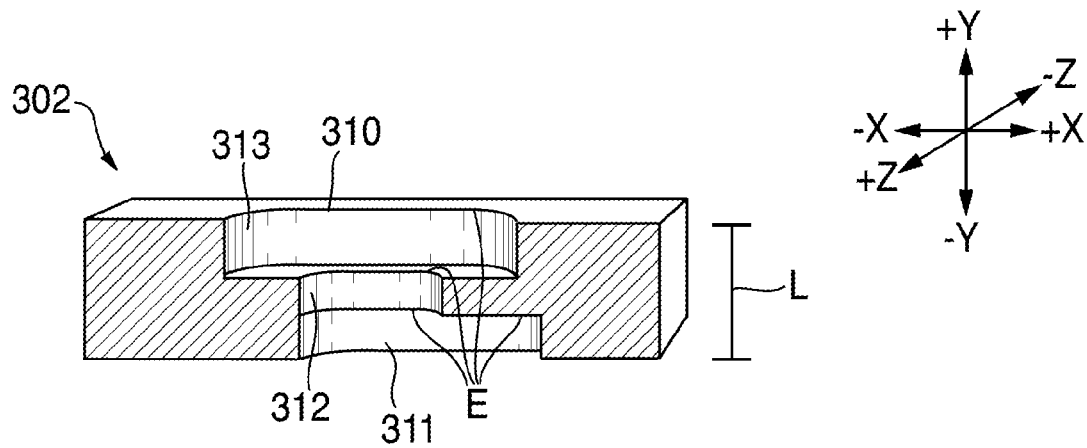
FIG. 4A is a cross-sectional view of a block-shaped structure of the airflow control system of FIG. 3, in accordance with at least one embodiment of the invention.
Figure 4B:
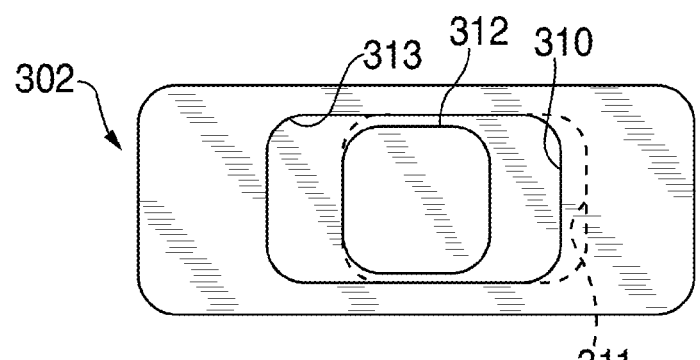
FIG. 4B is a plan view of the block-shaped structure of FIG. 4A, in accordance with at least one embodiment of the invention.

FIG. 4A is a cross sectional view of block-shaped structure 302, prior to element 304 being formed therein. FIG. 4B is a plan view of block-shaped structure 302. Block-shaped structure 302 may have any suitable thickness, and may include cavity 310 for retaining pre-processed airflow impedance elements. Cavity 310 may be shaped to efficiently receive the pre-processed airflow impedance elements during filling thereof. For example, cavity 310 may include differently sized sections 311, 312, and 313 having relatively sharp edges E. Each of sections 311, 312, and 313 may be sized to retain a predetermined amount of pre-processed airflow impedance elements. It should be appreciated that, although FIG. 4A shows cavity 310 having an irregular shape, cavity 310 may take any other suitable shape. For example, instead of having sharp edges E, cavity 310 may have an hourglass shape with smoother edges. With smoother edges, cavity 310 may be more easily filled with the pre-processed airflow impedance elements. Moreover, the shape of cavity 310 (e.g., the undercut shape of cavity 310, as shown in FIGS. 3-5B) may prevent filled pre-processed airflow impedance elements from escaping block-shaped structure 302 once they have been processed (e.g., heated/sintered) to form airflow impedance element 304.

Figure 4C:
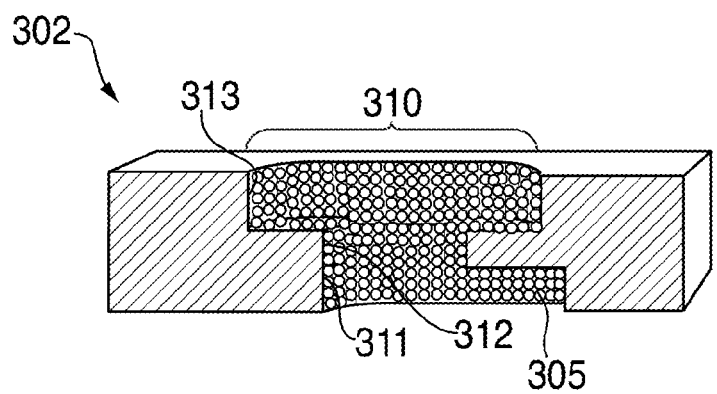
FIG. 4C is a cross-sectional view of the block-shaped structure of FIG. 4A, including a plurality of pre-processed airflow impedance elements, in accordance with at least one embodiment of the invention.

FIG. 4C is a cross-sectional view of block-shaped structure 302, including a plurality of pre-processed airflow impedance elements 305 residing therein. Although only a cross-section of block-shaped structure 302 is shown, it should be appreciated that pre-processed airflow impedance elements 305 may substantially fill the entirety of cavity 310. As described above with respect to FIG. 3, airflow control system 300 may be configured to match the frequency response of microphone 160. In particular, the physical configuration of cavity 310 and of each one of pre-processed airflow impedance elements 305 may be defined based on the frequency response of microphone 160. For example, the size of sections 311, 312, and 313 may each be defined to retain a predetermined amount of pre-processed airflow impedance elements 305, such that the non-linear pathways, that may form throughout as a result of fusion of pre-processed airflow impedance elements 305, may allow human audible sound to pass.

Figure 5A:
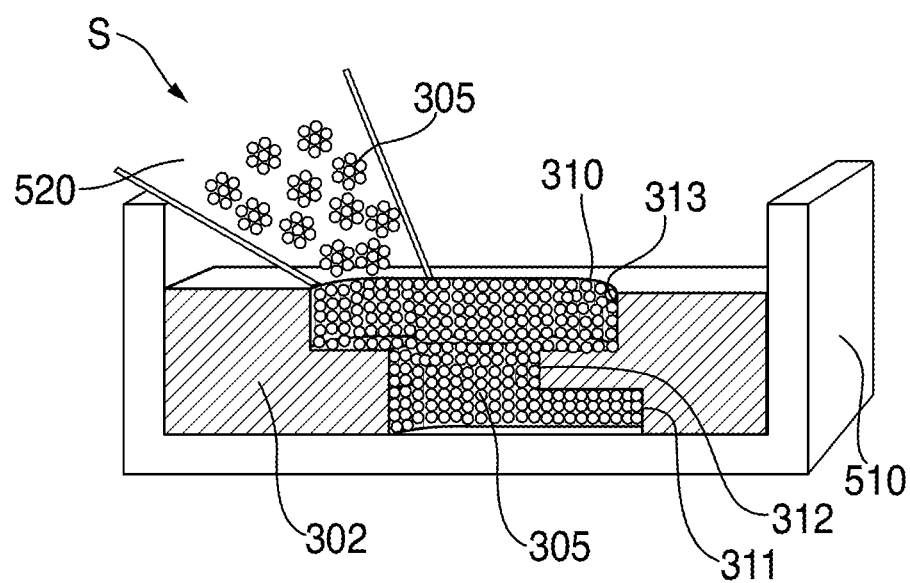
FIG. 5A shows a cross-sectional view of the block-shaped structure of FIG. 4A undergoing filling and processing of the plurality of pre-processed airflow impedance elements of FIG. 4C, in accordance with at least one embodiment of the invention.

FIG. 5A shows a cross-sectional view of block-shaped structure 302 undergoing filling and processing of pre-processed airflow impedance elements 305. As shown in FIG. 5A, block-shaped structure 302 may be situated in an oven 510. Oven 510 may include a feeding surface 520 for feeding pre-processed airflow impedance elements 305 into cavity 310. For example, as pre-processed airflow impedance elements are placed onto feeding surface 520, these pre-processed airflow impedance elements 305 may be directed (e.g., by gravity) down feeding surface 520 in a direction S into cavity 310. Oven 510 may also include a vibrating mechanism (not shown) that may vibrate block-shaped structure 302 during and/or after feeding of pre-processed airflow impedance elements 305. In this manner, pre-processed airflow impedance elements 305 may thoroughly occupy and settle throughout sections 311, 312, and 313 of cavity 310. During and/or after feeding of pre-processed airflow impedance elements 305, oven 510 may also be configured to generate heat (e.g., at a temperature of 120 degrees Celsius) around block-shaped structure 302. As a result, pre-processed airflow impedance elements 305 may fuse or sinter to form airflow impedance element 304, as described above.

Although FIG. 5A shows block-shaped structure 302 being situated directly on oven 510, in some embodiments, block-shaped structure 302 may instead be situated on a frame (not shown) that may be in contact with oven 510. Further, in some embodiments, the vibrating mechanism may be separate (not shown) from oven 510 rather than being a part of oven 510.

Figure 5B:
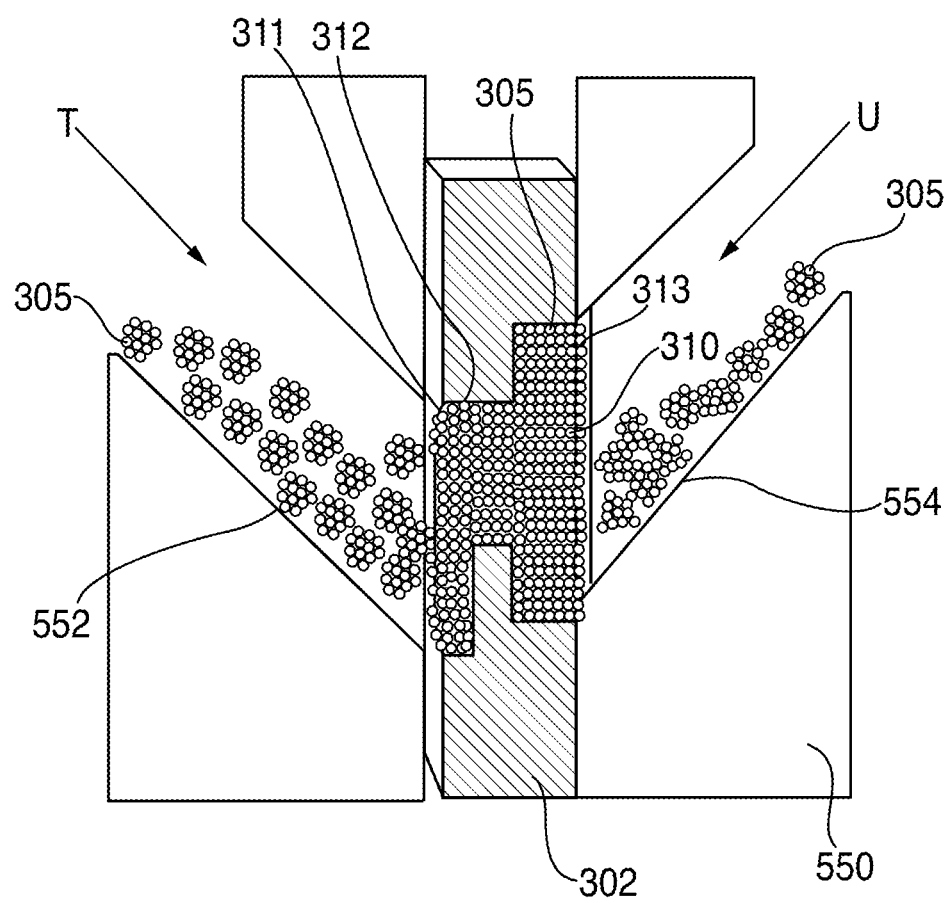
FIG. 5B shows a cross-sectional view of the block-shaped structure of FIG. 4A undergoing another filling and processing of the plurality of pre-processed airflow impedance elements of FIG. 4C, in accordance with at least one embodiment of the invention.

FIG. 5B shows a cross-sectional view of block-shaped structure 302 undergoing another filling and processing of pre-processed airflow impedance elements 305. As an alternative to filling pre-processed airflow impedance elements 305 into cavity 310 from a single direction (e.g., as shown in FIG. 5A), block-shaped structure 302 may also be filled with pre-processed airflow impedance elements 305 from a plurality of directions. For example, block-shaped structure 302 may be rotated to stand as shown in FIG. 5B, and may be situated on an oven 550. Oven 550 may include feeding surfaces 552 and 554, which may each be similar to feeding surface 520 of oven 510, for feeding pre-processed airflow impedance elements 305 into cavity 310. As pre-processed airflow impedance elements 305 are placed onto feeding surfaces 552 and 554, these pre-processed airflow impedance elements 305 may be directed (e.g., by gravity) down feeding surfaces 552 and 554, in directions T and U, respectively, into cavity 310. This manner of filling may ensure that cavity 310 is thoroughly filled with pre-processed airflow impedance elements 305.

In some embodiments, after pre-processed airflow impedance elements 305 are filled and processed as shown in FIG. 5B (e.g., to form airflow impedance element 304), excess portions of the processed element may reside or be adhered to outer surfaces of block-shaped structure 302. Thus, when block-shaped structure 302 is removed from oven 550, these outer surfaces of block-shaped structure 302 may be brushed or shaved to remove these excess portions.

Figure 6:
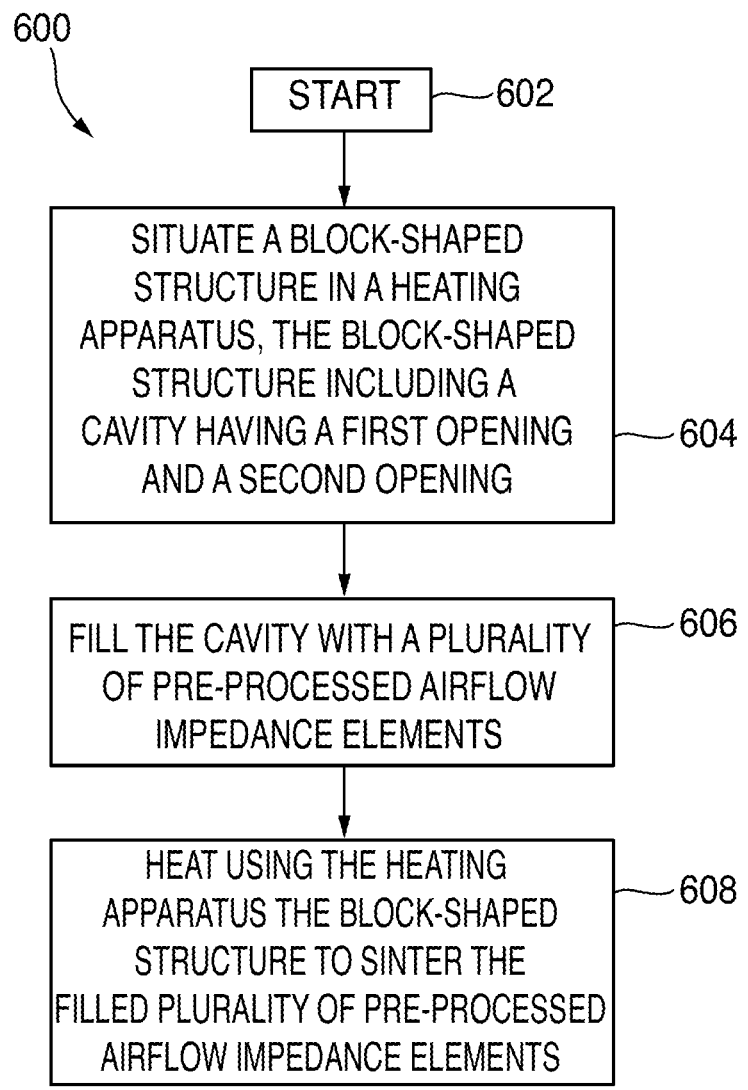
FIG. 6 is an illustrative process of manufacturing the airflow control system of FIG. 3, in accordance with at least one embodiment of the invention.

FIG. 6 is an illustrative process of manufacturing airflow control system 300. Process 600 may begin at step 602.

At step 604, the process may include situating a block-shaped structure in a heating apparatus, the block-shaped structure including a cavity having a first opening and a second opening. For example, step 604 may include situating block-shaped structure 302 in oven 510, as shown in FIG. 5A. Block-shaped structure 302 may include cavity 310 that have openings 320 and 322.

At step 606, the process may include filling the cavity with a plurality of pre-processed airflow impedance elements. For example, step 606 may include filling cavity 310 with the plurality of pre-processed airflow impedance elements 305. In some embodiments, oven 510 may be vibrated during the filling of the plurality of pre-processed airflow impedance elements 305. For example, a vibrating machine may be coupled to oven 510 and the process may include vibrating oven 510 prior to, during, and/or after the plurality of pre-processed airflow impedance elements 305 are filled into cavity 310. This vibration may allow the plurality of pre-processed airflow impedance elements 305 to thoroughly fill cavity 310 so as to form a uniform sintered block when the plurality of pre-processed airflow impedance elements 305 are subjected to heat. As part of vibrating oven 510, force may be applied to one or more portions of block-shaped structure 302 in order to keep block-shaped structure 302 fixed to oven 510.

At step 608, the process may include heating using the heating apparatus the block-shaped structure to sinter the filled plurality of pre-processed airflow impedance elements in the cavity. For example, step 608 may include heating using oven 510 block-shaped structure 302 to sinter the filled plurality of pre-processed airflow impedance elements 305 in cavity 310. It should be appreciated that the heating can occur during and/or after filling the plurality of pre-processed airflow impedance elements 305 into cavity 310.

In some embodiments, block-shaped structure 302 may be composed of plastic material or the like. In these embodiments, the process may include heating block-shaped structure 302 and the plurality of pre-processed airflow impedance elements 305 to a particular temperature (e.g., just enough to sinter the plurality of pre-processed airflow impedance elements 305 to create the non-linear pathways described above) oven 510. For example, the process may include heating the plurality of pre-processed airflow impedance elements 305 at approximately 120 degrees Celsius. In other embodiments, block-shaped structure 302 may be at least partially composed of metal or the like. In these embodiments, the process may include heating block-shaped structure 302 via inductive heating, which may provide a consistent temperature throughout block-shaped structure 302. As a result of such inductive heating, the plurality of pre-processed airflow impedance elements 305 may be indirectly heated and sintered.

In some embodiments, instead of filling pre-processed airflow impedance elements 305 into cavity 310 from a single direction (e.g., as shown in and described above with respect to FIG. 5A), pre-processed airflow impedance elements 305 may be filled from a plurality of directions (e.g., as shown in and described above with respect to FIG. 5B). For example, step 604 may include positioning block-shaped structure 302 upright in oven 550, and step 606 may include filling pre-processed airflow impedance elements 305 from both sides of block-shaped structure 302. In these embodiments, there may not be a need to vibrate pre-processed airflow impedance elements 305 during filling thereof. Step 608 may then include sintering pre-processed airflow impedance elements 305 to form airflow impedance element 304.

Figure 7:
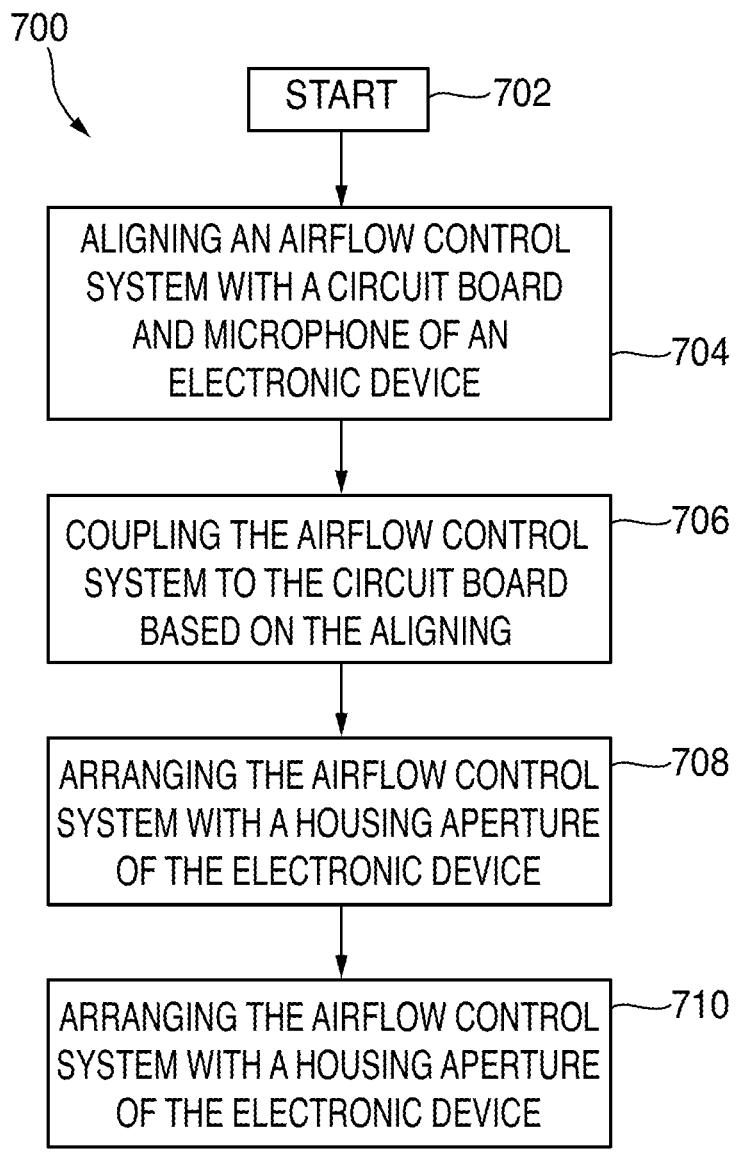
FIG. 7 is an illustrative process of integrating the airflow control system of FIG. 3 to the portion of the electronic device of FIG. 2, in accordance with at least one embodiment of the invention.

FIG. 7 is an illustrative process of integrating airflow control system 300 with electronic device 100. Process 700 may begin at step 702. At step 704, the process may include aligning an airflow control system with a circuit board and microphone of an electronic device. For example, the process may include aligning airflow control system 300 with circuit board 170 and microphone 160 (which may be situated on circuit board 170) such that airflow impedance element 304 of airflow control system 300 may at least partially overlap with microphone aperture 160a in a particular direction (e.g., in the +Y or −Y directions of FIG. 3).

At step 706, the process may include coupling the airflow control system to the circuit board based on the aligning. For example, the process may include applying adhesive 190 between circuit board 170 and a top surface of airflow control system 300 to secure airflow control system 300 to circuit board 170. In some embodiments, adhesive 190 may be formed by cutting out an adhesive sheet such that adhesive 190 may include cut-out 192.

At step 708, the process may include arranging the airflow control system with a housing aperture of the electronic device. For example, the process may include arranging airflow control system 300 with housing aperture 120 such that airflow impedance element 304 of airflow control system 300 may at least partially overlap with housing aperture 120 in a particular direction (e.g., in the +Y or −Y directions of FIG. 3).

At step 710, the process may include coupling the airflow control system to a portion of a housing of the electronic device based on the arranging. For example, the process may include applying adhesive 180 between a bottom surface of airflow control system 300 and internal surface side 101i of housing 101 to secure airflow control system 300 to housing 101. In some embodiments, adhesive 180 may be formed by cutting out an adhesive sheet such that adhesive 180 may include cut-out 182.

In some embodiments, airflow control system 300 may be composed of plastic or a similar type of material, and thus, one or more of adhesives 180 and 190 may include any suitable type of adhesive that may adhere to plastic. In other embodiments, airflow control system 300 may be composed of metal or a similar type of material, and thus, one or more of adhesives 180 and 190 may include any suitable type of adhesive that may adhere to metal (e.g., solder).

It is to be understood that the steps shown in each one of processes 600 and 700 of FIGS. 6 and 7, respectively, are merely illustrative and that existing steps may be modified or omitted, additional steps may be added, and the order of certain steps may be altered.

The described embodiments of the invention are presented for the purpose of illustration and not of limitation.

What is claimed is:

1. An airflow control system for controlling airflow toward a microphone of an electronic device, the airflow control system comprising:
   a planar block-shaped structure bonded between an aperture in an outermost surface of the electronic device and the microphone, comprising a passageway, the passageway comprising:
      a first opening configured to align with the aperture in the outermost surface of the electronic device; and
      a second opening configured to align with an aperture of the microphone; and
   airflow impedance elements disposed within the passageway and sintered together to form a single structure that is secured within the passageway by a shape of sidewalls defining the passageway, the airflow impedance elements being constructed to control the airflow from the aperture in the outermost surface of the electronic device to the aperture of the microphone.

2. The airflow control system of claim 1, wherein a central portion of the sidewalls protrudes into the single structure to secure the airflow impedance elements within the passageway.

3. The airflow control system of claim 1, wherein the airflow impedance elements form a porous structure.

4. The airflow control system of claim 1, wherein the airflow impedance elements are configured to limit speed of airflow through the passageway.

5. The airflow control system of claim 4, wherein:
   the airflow impedance element comprises a plurality of non-linear pathways from the first opening to the second opening.

6. The airflow control system of claim 1, wherein the airflow impedance elements are tuned to match a frequency response of the microphone.

7. The airflow control system of claim 1, wherein the airflow impedance elements fill the passageway from the first opening to the second opening.

8. The airflow control system of claim 1, wherein the planar block-shaped structure is composed of one of plastic and metal.

9. The airflow control system of claim 1, wherein the airflow impedance elements comprise one of polyethylene and polypropylene.

10. A method of manufacturing an airflow control system for a microphone, the method comprising:
   situating a planar block-shaped structure in a heating apparatus, the planar block-shaped structure comprising a passageway having a first opening and a second opening;
   filling the passageway with pre-processed airflow impedance elements;

heating using the heating apparatus the planar block-shaped structure to sinter the filled pre-processed airflow impedance elements together in the passageway, the pre-processed airflow impedance elements being retained within the passageway by a shape of sidewalls defining the passageway; and bonding the planar block-shaped structure between an aperture in an outermost surface of an electronic device and the microphone to couple the first opening to the aperture in the outermost surface of the electronic device and the second opening to an aperture of the microphone.

11. The method of claim 10, wherein the situating comprises securing at least a portion of the planar block-shaped structure to the heating apparatus.

12. The method of claim 10, wherein a central portion of the sidewalls protrudes into the pre-processed airflow impedance elements to retain the pre-processed airflow impedance elements within the passageway.

13. The method of claim 10, wherein the heating comprises heating the planar block-shaped structure to approximately 120 degrees Celsius.

14. The method of claim 10, wherein filling the passage way comprises inserting pre-processed airflow impedance elements into the passageway through both the first and second openings.

15. The method of claim 14, wherein the airflow impedance element is configured to:

impede airflow that exerts a force beyond a predetermined amount; and pass sound that matches a frequency response of the microphone.

16. The method of claim 10, wherein the heating comprises inductively heating the structural part.

17. An electronic device comprising:
 a housing comprising a housing aperture in an outermost surface;
 a circuit board having mounted thereon a microphone, the microphone having a microphone aperture;
 a planar airflow control system bonded to the housing and the circuit board, the airflow control system fluidically coupling the housing aperture to the microphone aperture by defining a passageway between the housing aperture and the microphone aperture; and
 sintered airflow impedance elements disposed within the passageway to control airflow through the passageway, the airflow impedance elements being sintered together and retained within the passageway by a shape of sidewalls defining the passageway.

18. The electronic device of claim 17, wherein the sidewalls define an undercut shape that retains the sintered airflow impedance elements within the passageway.

19. The electronic device of claim 18, wherein a second surface of the airflow control system is coupled to the circuit board via a second adhesive.

20. The electronic device of claim 17, wherein the airflow impedance elements comprise sintered plastic.

21. The electronic device of claim 17, wherein the airflow control system limits speed of airflow applied to the microphone aperture.

* * * * *